J. V. GIESLER.
AUTOMOBILE RADIATOR UNIT.
APPLICATION FILED MAY 12, 1917.
1,411,487.
Patented Apr. 4, 1922.
2 SHEETS—SHEET 1.
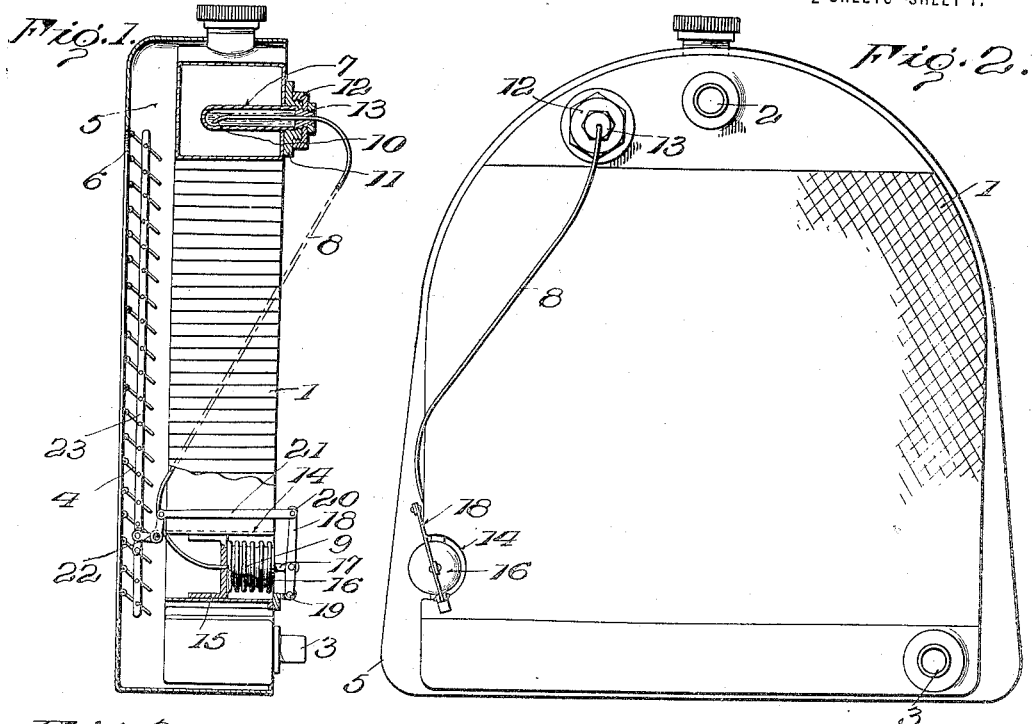
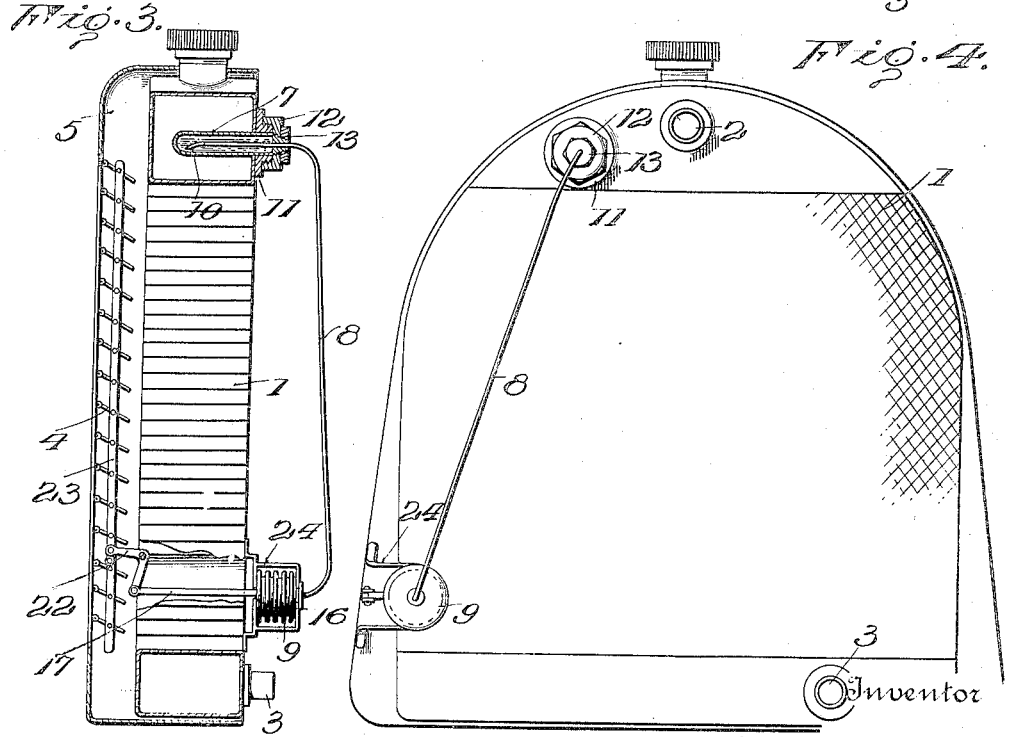
Inventor
Jean V. Giesler
By Monro, Cameron, Lewis & Massie
Attorneys J. V. GIESLER.
AUTOMOBILE RADIATOR UNIT.
APPLICATION FILED MAY 12, 1917.
1,411,487.
Patented Apr. 4, 1922.
2 SHEETS—SHEET 2.
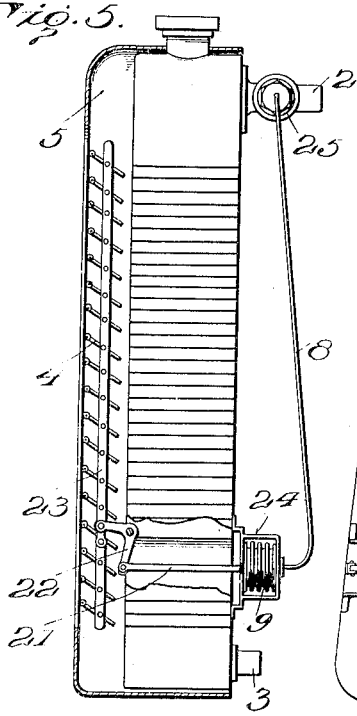
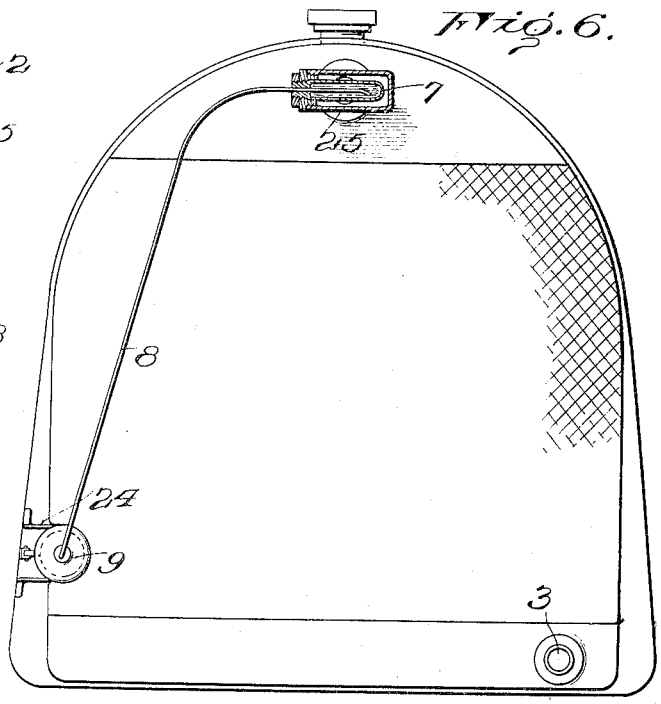
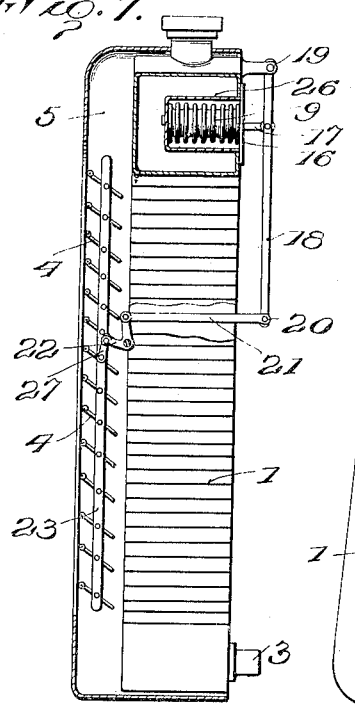
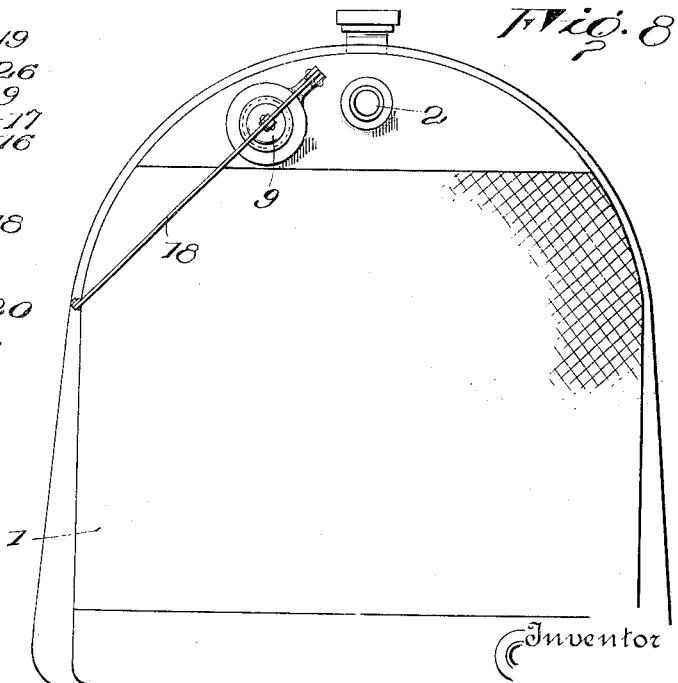
Inventor
Jean V. Giesler
By Mauro, Cameron, Lewis & Massie
Attorneys

UNITED STATES PATENT OFFICE.

JEAN V. GIESLER, OF KNOXVILLE, TENNESSEE, ASSIGNOR TO THE FULTON COMPANY, OF KNOXVILLE, TENNESSEE, A CORPORATION OF MAINE.

AUTOMOBILE RADIATOR UNIT.

1,411,487.  Specification of Letters Patent.  Patented Apr. 4, 1922.

Application filed May 12, 1917. Serial No. 168,240.

*To all whom it may concern:*

Be it known that I, JEAN V. GIESLER, a citizen of the United States of America, and a resident of Knoxville, Tennessee, have invented a new and useful Improvement in Automobile Radiator Units, which invention is fully set forth in the following specification.

This invention relates to automobile radiators of the type having thermostatically controlled damper mechanism for regulating the passage of air therethrough.

It is an object of this invention to provide an automobile radiator with damper mechanism and a thermostat for controlling the same which together shall constitute a unit that may be cheaply manufactured and easily installed as well in automobiles already in use as those in course of manufacture.

It has heretofore been proposed to provide an automobile radiator with damper mechanism for controlling the passage of air therethrough and with a thermostat operatively connected to such damper mechanism and subjected to the cooling medium flowing through the cooling system which includes such radiator. Prior devices, however, have had the inherent objection that they require considerable space under the engine hood as well as special fittings, connections, packings and joints, which are likely to leak render the same expensive to manufacture and more or less difficult to install.

It has also been proposed to provide an automobile radiator with damper mechanism for controlling the passage of air therethrough and with a thermostat operatively connected to said damper mechanism, said thermostat being mounted on the front of the radiator in metallic conduction with the radiator walls. Such a device has had the inherent objection that it is slow in responding to temperature variations in the cooling medium, owing to the heat lag incident to metallic conduction, and that its position on the front of the radiator subjects it to the temperature of the outside air especially when the automobile is in motion whereby its sluggishness in responding to rising temperature of the cooling medium is increased and, under low temperature conditions, it becomes non-responsive to temperature changes in the cooling medium.

It is an object of this invention to provide an automobile radiator with damper mechanism for controlling the passage of air therethrough and with a thermostat operatively connected to said damper mechanism which requires little or no space under the engine hood avoids the special fittings, packings, connections and joints heretofore employed in devices of the first class referred to, and which is promptly responsive to temperature variations of the cooling medium and substantially unaffected by the temperature conditions of the outside air.

A further object of this invention is to provide a device of the type characterized with thermosensitive means that shall move the damper mechanism to a position of safety upon failure of the temperature control of said mechanism.

Stated broadly, the automobile radiator unit comprises damper mechanism at one side of the radiator for controlling the passage of air therethrough and a thermostat operatively connected to said damper mechanism, said thermostat including a container for a thermosensitive or volatile fluid supported in unitary relationship with said radiator and subjected to the cooling medium flowing therethrough, said container being charged preferably with said fluid at a pressure below that of the surrounding medium.

The invention is capable of receiving a variety of mechanical expressions, four of which are shown on the accompanying drawings, but it is to be expressly understood that the drawings are for purposes of illustration only, and are not to be construed as definitions of the limits of the invention, reference being had to the appended claims for that purpose.

Referring to said drawings,

Fig. 1 is a side elevation, partly in section, of an automobile radiator unit embodying the present invention;

Fig. 2 is a rear elevation of the embodiment of Fig. 1;

Fig. 3 is a side elevation, partly in section, of a second embodiment of the present invention;

Fig. 4 is a rear elevation of the embodiment of Fig. 3;

Fig. 5 is a side elevation, partly in section, of a third embodiment of the present invention;

Fig. 6 is a rear elevation of the embodiment of Fig. 5;

Fig. 7 is a side elevation, partly in section of a fourth embodiment of the present invention;

Fig. 8 is a rear elevation of the embodiment of Fig. 7.

In the form shown in Figs. 1 and 2, 1 designates an automobile radiator of any suitable construction, the same being provided with an inlet nipple 2 and an outlet nipple 3. Positioned at one side of the radiator, preferably at the front side thereof, is a damper mechanism shown as consisting of a series of pivoted shutters 4. It is to be expressly understood, however, that any other suitable form of damper mechanism may be employed if desired. For supporting said shutters, the radiator 1 is shown as provided with a frame or housing 5 surrounding the periphery thereof, and extending to the front thereof, in which latter portion is provided the opening 6 controlled by the shutters 4. While a separate frame or housing 5 has been illustrated, it is to be expressly understood that such is not essential, however, as the radiator itself may be provided with a unitary or integral extension for supporting the shutters.

A thermostat is operatively connected to the shutters 4 for opening and closing the same. While a wide variety of thermostats may be employed, that shown comprises a bulb 7 in communication through a pipe 8 with an expansible and collapsible corrugated metal vessel 9, said pipe 8 being illustrated as projecting into the interior of the bulb 7 and provided with a downwardly bent end 10. Bulb 7, pipe 8 and vessel 9 are charged with a thermosensitive or volatile fluid, preferably at a pressure below that of the surrounding medium, in which event vessel 9 is constructed so as to be collapsible against an elastic force, by preference inherent in the same as by making its walls of resilient metal. This thermostat is mounted in any suitable way in unitary relationship with the radiator with the bulb 7 extending within the radiator in the path of the cooling medium flowing therethrough. In the form shown in Figs. 1 and 2 the bulb 7 is carried by a plate 11 suitably secured to the rear face of the radiator in position to project said bulb into the upper water chamber of the radiator, the said bulb being connected to said plate by nuts 12 and 13 respectively screw-threaded to a boss on said plate and a stem on said bulb. Also a thermostat-chamber 14 may be provided, in the core of the radiator adjacent one side thereof or otherwise suitably positioned, for receiving the vessel 9, said vessel being shown as supported therein by a rigid member 15 which may constitute the stationary end wall of said vessel. The pipe 8 is shown as communicating with the interior of the bulb and the vessel through openings in the aforesaid threaded stem of the bulb and the rigid wall 15 in the chamber 14.

Movable end wall 16 of vessel 9 is operatively connected to the shutters 4 in any suitable way. In the form shown, said wall is connected through stem 17 with a lever 18 pivoted at 19 to a lug on the radiator and pivoted at 20 to a link 21 which is connected through bell-crank 22 with a rod 23 pivotally connected to each of the shutters 4.

In the form shown in Figs. 3 and 4, the radiator 1 is provided with shutters 4, as in the construction just described, and with a thermostat comprising a bulb 7 projecting into the upper water chamber of the radiator and connected through pipe 8 with an expansible and collapsible corrugated vessel 9, in this case supported on the rear face of the radiator by a bracket member 24. The movable end wall 16 of vessel 9 is connected by the stem 17 directly to the bell-crank 22 in turn connected to the shutter-operating rod 23, the connections extending through or along the side of the radiator as desired. This construction avoids the necessity of providing a special thermostat chamber in the core of the radiator, while it is not so compact owing to the projection of the vessel 9 from the rear face of the radiator.

Referring to Figs. 5 and 6, the construction here shown is the same as that illustrated in Figs. 3 and 4, except that the bulb 7 of the thermostat is mounted in the inlet nipple 2 instead of in the upper water chamber of the radiator. To this end the nipple 2 is provided intermediate its length with a housing 25 into which extends said bulb 7. This construction possesses certain advantages, as it avoids the aperture cut in the wall of the upper portion of the radiator. Obviously, the bulb of the construction shown in Figs. 1 and 2 could be similarly mounted in the inlet nipple.

Referring to Figs. 7 and 8, a further embodiment is shown which occupies a minimum of space and is very easily installed. In the form shown, the radiator 1 is provided with shutters 4, as in the forms heretofore described, and with a bulb 26 extending within the upper portion of the radiator in the path of the cooling medium flowing therethrough, said bulb 26 being suitably connected to the radiator wall and constituting a thermostat-chamber for an expansible and collapsible corrugated vessel 9 charged with a thermosensitive fluid as heretofore described. The movable end wall 16 of said vessel is connected by stem 17 to a lever 18 pivoted at 19 to a lug extending from the rear face of the radiator and pivoted at 20 to a link 21 which is connected through bell-crank 22 and a second link 27 to the shutter-operating rod 23.

In each of the constructions, as the temperature of the cooling medium flowing through the radiator rises, the vapor tension of the thermosensitive fluid in the thermostat increases and expands vessel 9, opening the shutters 4 through the linkage connected thereto and to the movable wall 16 of said vessel. As the thermostat is charged with a thermosensitive fluid at a pressure below that of the surrounding medium, vessel 9 is normally collapsed against an opposing elasticity preferably inherent in its walls. Upon the occurrence of a leak in the thermostat, the pressure within and without the same becomes equalized, and said elasticity causes the vessel to expand to its fullest extent, moving the shutters 4 to wide open position, which is the position of safety, permitting the maximum passage of air through the radiator and preventing overheating of the engine.

It will thus be seen that a radiator unit for automobiles has been provided having damper mechanism at one side for controlling the passage of air through the radiator and a thermostat supported in unitary relationship with the radiator and operatively connected with the damper mechanism, which thermostat is subjected to the cooling medium flowing through the radiator and responsive to its temperature variations. Owing to the compactness and simplicity of the construction, little or no additional space under the engine hood is required thereby and such radiator unit may be inexpensively manufactured and cheaply sold for installation either upon automobiles already in use or automobiles in course of construction. As the thermostat is subjected directly to the cooling medium it is sensitively responsive to temperature variations in the same while, as it is positioned in the rear of the damper mechanism, it is protected from the temperature of the outside air which protection is of particular importance when the automobile is in more or less rapid motion. Furthermore, a device has been provided which insures against dangerous conditions arising in the cooling system by failure of the temperature control through a leak in the thermostat.

While the embodiments shown on the drawings have been described with considerable particularity, it is to be expressly understood that the invention is not restricted to the forms illustrated, as the same is capable of receiving a variety of mechanical expressions, some of which will readily suggest themselves to those skilled in the art. While the bulb of the thermostat has been shown as subjected to the cooling medium in the upper water chamber of the radiator or its communicating nipple, this position of the bulb is not essential, as the same may be subjected to the cooling medium in any other suitable portion of the radiator unit. Changes may also be made in the type and arrangement of the connections between the thermostat and the damper mechanism without departing from the spirit of this invention. Reference is therefore to be had to the claims hereto appended, for a definition of the limits of the invention.

What is claimed is:—

1. An automobile radiator unit comprising in combination with the radiator proper, damper mechanism at one side of said radiator for regulating the passage of air therethrough, a thermostat-chamber in said radiator, and a thermostat operatively connected to said damper mechanism and comprising an element in said chamber.

2. An automobile radiator unit comprising in combination with the radiator proper, damper mechanism at one side of said radiator for regulating the passage of air therethrough, and a thermostat operatively connected to said damper mechanism and comprising an element extending within said radiator.

3. An automobile radiator unit comprising in combination with the radiator, damper mechanism at one side of said radiator for regulating the passage of air therethrough, and a thermostat comprising an expansible and collapsible vessel carried by said radiator and communicating with a bulb subjected to the cooling medium, said vessel being operatively connected to said damper mechanism.

4. An automobile radiator unit comprising in combination with the radiator damper mechanism at one side of said radiator for regulating the passage of air therethrough, and a thermostat operatively connected to said damper mechanism and comprising a container for a thermosensitive fluid projecting into the radiator.

5. An automobile radiator unit comprising in combination with the radiator damper mechanism at the front of said radiator for regulating the passage of air therethrough, and a thermostat subjected to the cooling medium comprising an expansible and collapsible vessel carried by said radiator in the rear of and operatively connected to said damper mechanism.

6. An automobile radiator unit comprising in combination with the radiator proper, a thermostat-chamber in said radiator, damper mechanism at one side of said radiator for regulating the passage of air therethrough, and a thermostat comprising an expansible and collapsible vessel positioned in said chamber and operatively connected to said damper mechanism.

7. In combination with an automobile radiator, a radiator unit therefor comprising damper mechanism at one side of said radiator for regulating the passage of air therethrough, and a thermostat operatively connected to said damper mechanism and comprising a container for a volatile fluid carried by said radiator in the path of the cooling medium flowing therethrough.

8. In combination with an automobile radiator, a frame or housing member for said radiator provided with damper mechanism for regulating the passage of air through the radiator, and a thermostat operatively connected to said damper mechanism and comprising a bulb inserted in said radiator.

9. An automobile radiator unit comprising in combination with the radiator damper mechanism at one side of said radiator for regulating the passage of air therethrough, an expansible and collapsible vessel operatively connected to said damper mechanism, and a thermostat bulb connected to said vessel and carried by said radiator in the path of the cooling medium flowing therethrough.

10. An automobile radiator unit comprising in combination with the radiator damper mechanism at one side of said radiator for regulating the passage of air therethrough, and a thermostat carried by said radiator in the path of the cooling medium and operatively connected to said damper mechanism, said thermostat comprising an expansible and collapsible vessel charged with a thermosensitive fluid at a pressure below that of the surrounding medium.

11. An automobile radiator unit comprising in combination with the radiator damper mechanism at one side of said radiator for regulating the passage of air therethrough, a thermostat bulb carried by said radiator in the path of the cooling medium flowing through the same, an expansible and collapsible vessel connected to said bulb, said bulb and vessel being charged with a thermosensitive fluid at a pressure below that of the surrounding medium, and operative connections between said vessel and said damper mechanism.

12. In combination with an automobile radiator damper mechanism for regulating the passage of air through said radiator, a thermostat bulb carried by the radiator, an expansible and collapsible vessel carried by said radiator and connected to said bulb, and operative connections between said vessel and said damper mechanism.

13. In combination with an automobile radiator damper mechanism for regulating the passage of air through said radiator, a thermostat comprising a bulb inserted in the radiator, and operative connections between said thermostat and said damper mechanism.

14. In combination with an automobile radiator, damper mechanism for regulating the passage of air therethrough, and a thermostat operatively connected to said damper mechanism and comprising a container for a thermosensitive fluid in unitary relationship with the radiator and positioned in the path of the cooling medium flowing therethrough.

15. A radiator unit for automobiles comprising in combination with the radiator damper mechanism for regulating the passage of air through the radiator, and a thermostat operatively connected to said damper mechanism and comprising an expansible and collapsible vessel carried by the radiator in unitary relationship therewith and communicating with a container for a volatile fluid subjected to the cooling medium.

In testimony whereof I have signed this specification.

JEAN V. GIESLER.